United States Patent
Hussmann et al.

Patent Number: 6,101,535
Date of Patent: *Aug. 8, 2000

[54] PROCESS FOR SELECTING AND REQUESTING MULTIMEDIA SERVICES

[75] Inventors: Heinrich Hussmann, Tutzing; Thomas Theimer, München, both of Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/011,519
[22] PCT Filed: Jul. 23, 1996
[86] PCT No.: PCT/DE96/01348
   § 371 Date: Feb. 9, 1998
   § 102(e) Date: Feb. 9, 1998
[87] PCT Pub. No.: WO97/06639
   PCT Pub. Date: Feb. 20, 1997

[30] Foreign Application Priority Data

Aug. 9, 1995 [DE] Germany .......................... 195 29 339

[51] Int. Cl.⁷ .............. H04N 7/10; G06F 15/16
[52] U.S. Cl. ............ 709/217; 345/327; 348/10; 348/13; 348/552; 348/7; 348/12
[58] Field of Search ............... 348/12, 13, 552, 348/6, 7, 10; 345/327; 709/217

[56] References Cited

U.S. PATENT DOCUMENTS

| | | | |
|---|---|---|---|
| 5,247,347 | 9/1993 | Litteral et al. | 348/7 |
| 5,347,304 | 9/1994 | Moura et al. | 348/12 |
| 5,416,508 | 5/1995 | Sakuma et al. | 348/906 |
| 5,565,910 | 10/1996 | Rowse et al. | 348/15 |
| 5,600,364 | 2/1997 | Hendricks et al. | 348/1 |
| 5,608,446 | 3/1997 | Carr et al. | 348/6 |
| 5,629,978 | 5/1997 | Blumhardt et al. | 348/7 |
| 5,634,848 | 6/1997 | Tsuda et al. | 463/25 |
| 5,650,831 | 7/1997 | Farwell | 348/734 |
| 5,748,493 | 5/1998 | Lightfoot et al. | 364/514 |
| 5,787,259 | 9/1998 | Haroun et al. | 348/552 |
| 5,790,201 | 8/1998 | Antos | 348/552 |
| 5,802,449 | 9/1998 | Beller et al. | 348/7 |
| 5,835,843 | 11/1998 | Haddad | 455/4.2 |
| 5,880,768 | 3/1999 | Lemmons et al. | 348/1 |
| 5,886,732 | 3/1999 | Humpleman | 348/10 |
| 5,914,712 | 6/1999 | Sartain et al. | 345/327 |
| 5,945,987 | 8/1999 | Dunn | 345/327 |

FOREIGN PATENT DOCUMENTS

| | | |
|---|---|---|
| 0 396 062 | 11/1990 | European Pat. Off. . |
| 93/22877 | 11/1993 | WIPO . |
| 94/13107 | 6/1994 | WIPO . |
| 94/24803 | 10/1994 | WIPO . |
| 94/27296 | 11/1994 | WIPO . |
| 95/01058 | 1/1995 | WIPO . |

OTHER PUBLICATIONS

R. Franz et al., "Interactive Video—services, success factors and network solutions", ISS Symposium, Vol 2, Apr. 1995, pp. 256–260.

*Primary Examiner*—Andrew I. Faile
*Assistant Examiner*—Reuben M. Brown
*Attorney, Agent, or Firm*—Hill & Simpson

[57] ABSTRACT

The selection of multimedia offerings is simplified by the transmission of an electronic ticket loaded from a computer network with the assistance of a PC onto a set top box. On the set top box, the ticket enables the direct setup of a broadband connection to the server on which the offering is stored without further navigation measures.

10 Claims, 3 Drawing Sheets

PROCESS FOR SELECTING AND REQUESTING MULTIMEDIA SERVICES

BACKGROUND OF THE INVENTION

1. Field of the Invention

The present invention relates generally to a method for selecting multimedia offerings for display on a television set using a set top box.

2. Description of the Related Art

Interactive multimedia services can be utilized both with correspondingly equipped personal computers as well as with specific auxiliary devices such as a (Set Top Box, STB) for commercially available television sets. The PC (personal computer) has input devices such as keyboard and a mouse available to it and is therefore particularly suited for interactive services with text input and text display. Due to the large picture screen area, television sets with auxiliary device are preferably utilized for interactive services and for qualitatively high-grade playback of multimedia data. PCs are usually located in the work room in the dwelling, whereas the television set can usually be found in the living room. In the future, many households will have both a PC as well as a television set with an auxiliary device that are connected either locally or via public networks (see FIG. 1).

Interactive video services such as, for example, video-on-demand and other multimedia services are being currently tested in various pilot projects. Broadband communication networks such as the broadband ISDN (integrated services distributed network) that are capable of real-time transmission are required for the transmission of video films from a server and subscriber in order to assure the service quality that is demanded for video services. Television sets that are equipped with an auxiliary device such as a set top box (STB) for sequencing the interactive services are mainly employed as terminal equipment. The selection of the service provider as well as of the video films usually ensues with the assistance of specific applications also referred to as (navigators) that are made available by the network operator or the service provider.

The PC is also being increasingly utilized for communication tasks (fax, Internet access) in private households. Computer networks, such as the Internet, are in fact not suitable for the transmission of video data in real time. However, these networks offer a multitude of services and information that can be accessed with the assistance of user-friendly applications such as, for example, Mosaic or Netscape. In particular, the Internet is developing more and more from a search network to a platform for all types of commercial services that are distributed via the network. In the future, vendors of interactive video services will also advertize their services in the Internet.

After the selection of a film, the user must first leave the PC in the previous solution, set up a connection to the corresponding service vendor via the broadband network with the assistance of the set top box and again operate the navigator thereof in order to ultimately receive the desired film.

SUMMARY OF THE INVENTION

The present invention is intended to automate and, thus, simplify this procedure in that the set top box directly employs the information loaded from a computer network with the assistance of the PC for the setup of a broadband connection to a multimedia server. This and other objects and advantages are achieved with the assistance of a method for the selection and the calling of multimedia services comprising a) with the assistance of a data communication terminal equipment connected to a computer network, a user selects at least one offering of a multimedia service that is stored on a multimedia server;

b) as a result of the selection event, a datafile with access data is transmitted to the user's terminal equipment, the access data unambiguously identify a selected offering and comprise the information required for the calling;

c) based on the criterion of the user, the data contained therein are c1) immediately transmitted to a set top box or c2) initially stored by the terminal equipment in order to be transmitted to a set top box later;

d) a selection menu, with whose assistance a user selects an offering, is generated on the set top box from the data of at least one datafile;

e) the set top box interprets the data contained in the datafile and sets up corresponding connections to the multimedia server via a broadband network with which the selected offering is called.

In this solution, at least one offering of a multimedia service stored on a multimedia server is selected by a user with the assistance of a data communication terminal equipment connected to a computer network. Subsequently, a datafile with access data is transmitted to the terminal equipment of the user as result of the selection procedure; the access data unambiguously identify a selected offering and comprise the information required for the calling. According to the criterion of the user, the data contained therein are either immediately transmitted to a set top box or are first stored by the terminal equipment in order to be able to be transmitted to a set top box later. A selection menu with whose assistance a user selects an offering is generated on the set top box from the transmitted data. The set top box interprets the data contained in the datafile and sets up a corresponding control connection to the multimedia server with which the selected offering is called.

The selection of multimedia offerings is thus simplified by the transmission—to a set top box—of an electronic ticket loaded from a computer network with the assistance of a PC. At the set top box, the ticket enables the direct setup of a broadband connection to the server on which the offering is stored without further navigation measures.

Advantageous developments and preferred embodiments of the invention provide that the datafile, in addition to containing the access data, also contains additional data that enable a user-friendly configuration of the use of the method. In one embodiment, the additional data comprise content-related data. In another embodiment, the additional data support an access control. In yet another embodiment, the additional data contain billing data.

The data are transmitted from the data communication terminal equipment to the set top box via a public communication network, or the data are transmitted from the data communication terminal equipment to the set top box via a local connection.

DETAILED DESCRIPTION OF THE PREFERRED EMBODIMENTS

The invention is described in greater detail below with the assistance of preferred exemplary embodiments and on the basis of the Figures.

Figure 1:
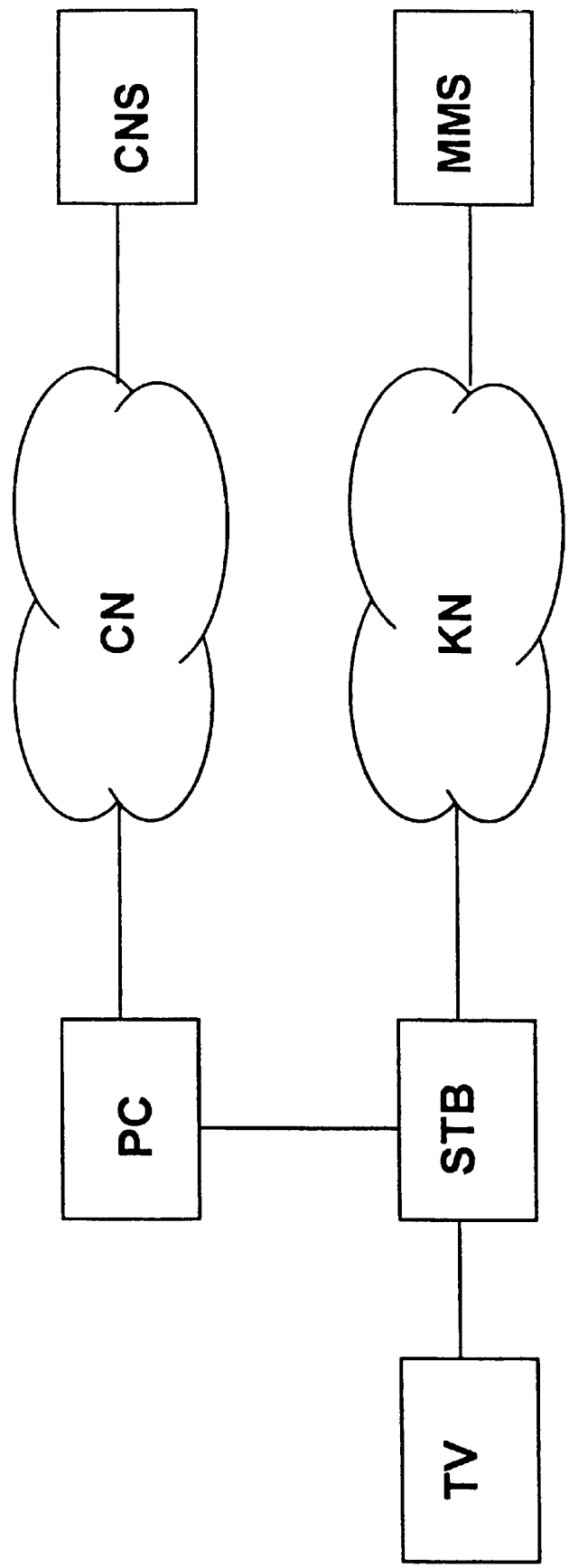
FIG. 1 schematically shows a network configuration on which the invention is typically based.

FIG. 1 shows a network configuration of a type underlying the invention. A television set TV is connected via a set top box STB to a broadband communication network KN with a multimedia server MMS, for example a video-on-demand server. A personal computer PC is connected to the set top box via a public communication network or via a local connection, this being connected at the same time to a computer network server CNS via a computer network CN.

Both a PC as well as a set top box and a television set are present as terminal equipment. The PC enables access to a computer network with network servers such as, for example, the Internet. The set top box is connected to a broadband communication network KN via which interactive video services of corresponding servers MMS can be used. A data exchange between PC and set top box is possible via the connection between PC and set top box (locally or via a public network or via a corresponding in-house network).

A version of the configuration shown in FIG. 1 is disclosed in German Patent Application 19 52 0045.4 (Integration von Computernetzen und Communikationsnetzen), whereby a PC and a set top box are both connected to the same broadband network. In this case, the access to the computer network ensues via the broadband communication network. The patent application likewise discloses a further configuration wherein the network server and the video server are combined to form one server or compound server, and whereby this server or compound server is connected both to the computer network as well as to the broadband communication network. These configurations are equivalent for the specification of the present invention.

Figure 2:
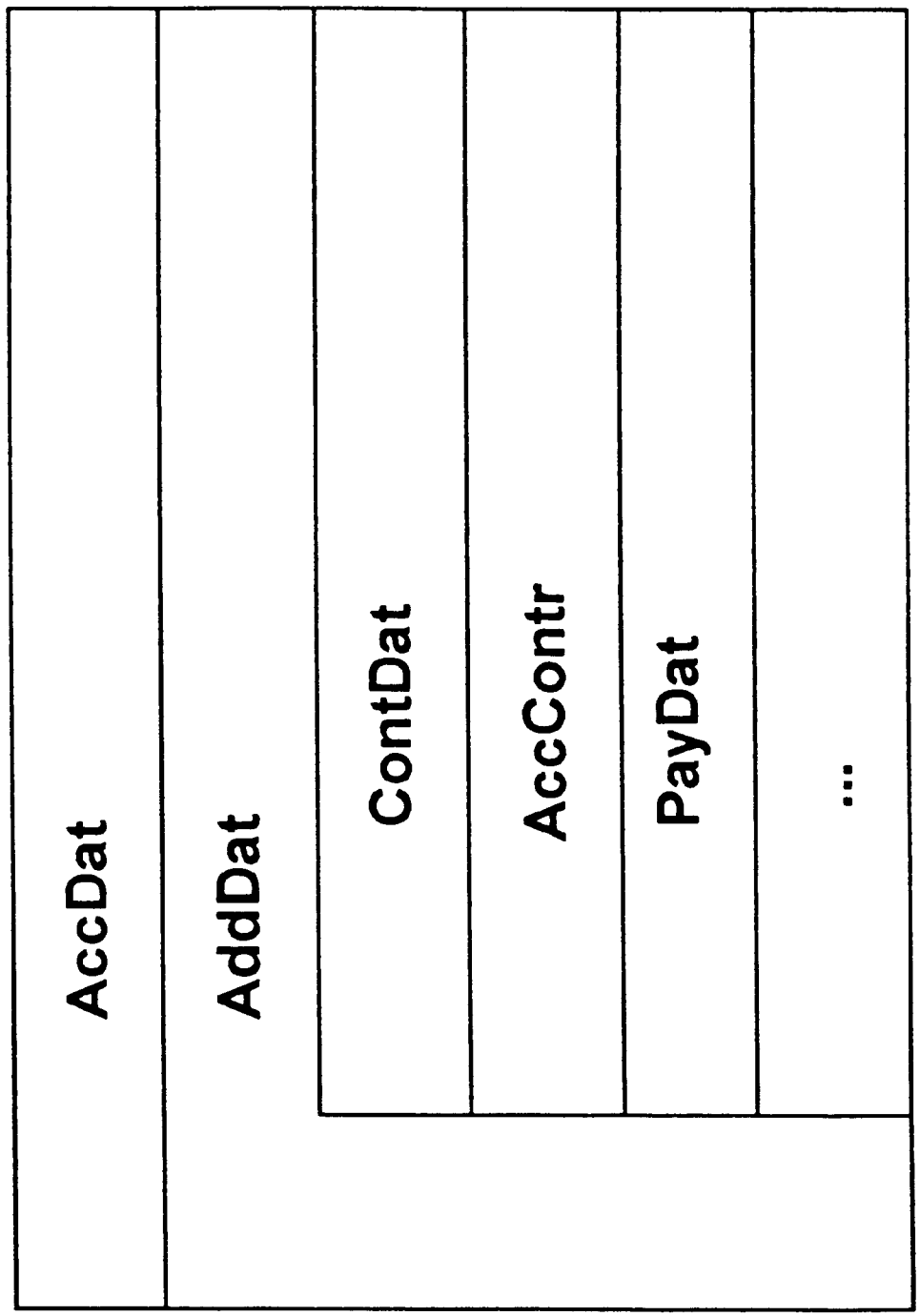
FIG. 2 schematically shows the structure of a ticket (datafile with access data) according to the present invention.

According to the present invention, a datafile, as shown in FIG. 2, that can also be referred to as ticket is transmitted to the data communication terminal equipment in the selection of an offering on a multimedia server with the assistance of an application that runs on a data communication terminal equipment that is connected to the multimedia service via a computer network. This ticket is called from a network server of the computer network and transmitted to the set top box via the personal computer (potentially after a previous intermediate storage). This ticket is a datafile that mainly contains access data (AccDat), i.e. data that unambiguously identify a selected offering and comprise all information required for calling the selected multimedia offering.

Typically, the datafile with access data has the following content:

Particular information about the operator and the type of service. On the basis of this information, the set top box checks whether the playback possibilities suffice for the use of the service.

Information about protocols to be sequenced with the video server. This particular information will often describe protocols for a plurality of connections. A typical protocol information is: control connection with DSM-CC via TCP/IP, video connection in the MPEG-2 program stream format.

The network address of the broadband server. This information can assume various formats dependent on the network operator. A broadband ISDN address is to be expected here for a longer time.

Parameters for the connections to be set up, such as bit rate or (in B-ISDN) "high and low layer information", potentially "called party sub-address".

A sequence of commands that are to be sent from the set top box to the video server. These commands serve the purpose of simulating the selection process usually implemented by the user. Under certain circumstances, there are specific short commands for the direct addressing of a specific information; however, it can also be necessary here to run through the selection hierarchies of a menu system.

With these access data, it is possible to set up a corresponding control connection to the multimedia server on which the offering is stored. FIG. 2 schematically shows the data structure of the ticket, i.e. the datafile transmitted in the selection procedure. Optionally, the datafile can also comprise additional data (AddDat) that can be content-related data (ContDat) or that can have something to do with the access control (AccContr) to the multimedia server or with billing data (PayDat).

Possible additional data (AddDat) are:

a) Content-Related Data (ContDat)

The user can deposit a plurality of tickets on the PC and design a local selection menu as he desires. Each ticket should therefore contain specific content-related data such as, for example, the title of the film, the actors, the director, a synopsis of the action and, potentially, a few frames or short video clips. The content-related data assist in the selection of the tickets and can be displayed by a navigator. In order to enable a corresponding presentation, the content-related data can, for example, be deposited in a hypertext format, as is likewise employed in the World-Wide Web. Content-related data are normally not encoded.

b) Access Control (AssContr)

The user can provide each ticket with an individual password in order to prevent an unauthorized use. This is particularly necessary when the ticket is already paid or contains billing data such as a credit card number or account number of the user. At the same time, the password serves for the encoding of all billing-related data.

c) Billing Data (PayDat)

The user has the possibility of paying for his ticket immediately upon issue or attaching the data required for later billing to the ticket. The immediate payment can ensue either by indicating a credit card number or via new payment means such as electronic cash. Given immediate payment, an authorization number is attached, this authorizing a one-time use of the corresponding service. When the payment is to ensue only when the service is actually used, the billing data can be composed of an account number or credit card number. In this way, a multiple use of the ticket is also possible. All billing data must be encoded.

Figure 3:
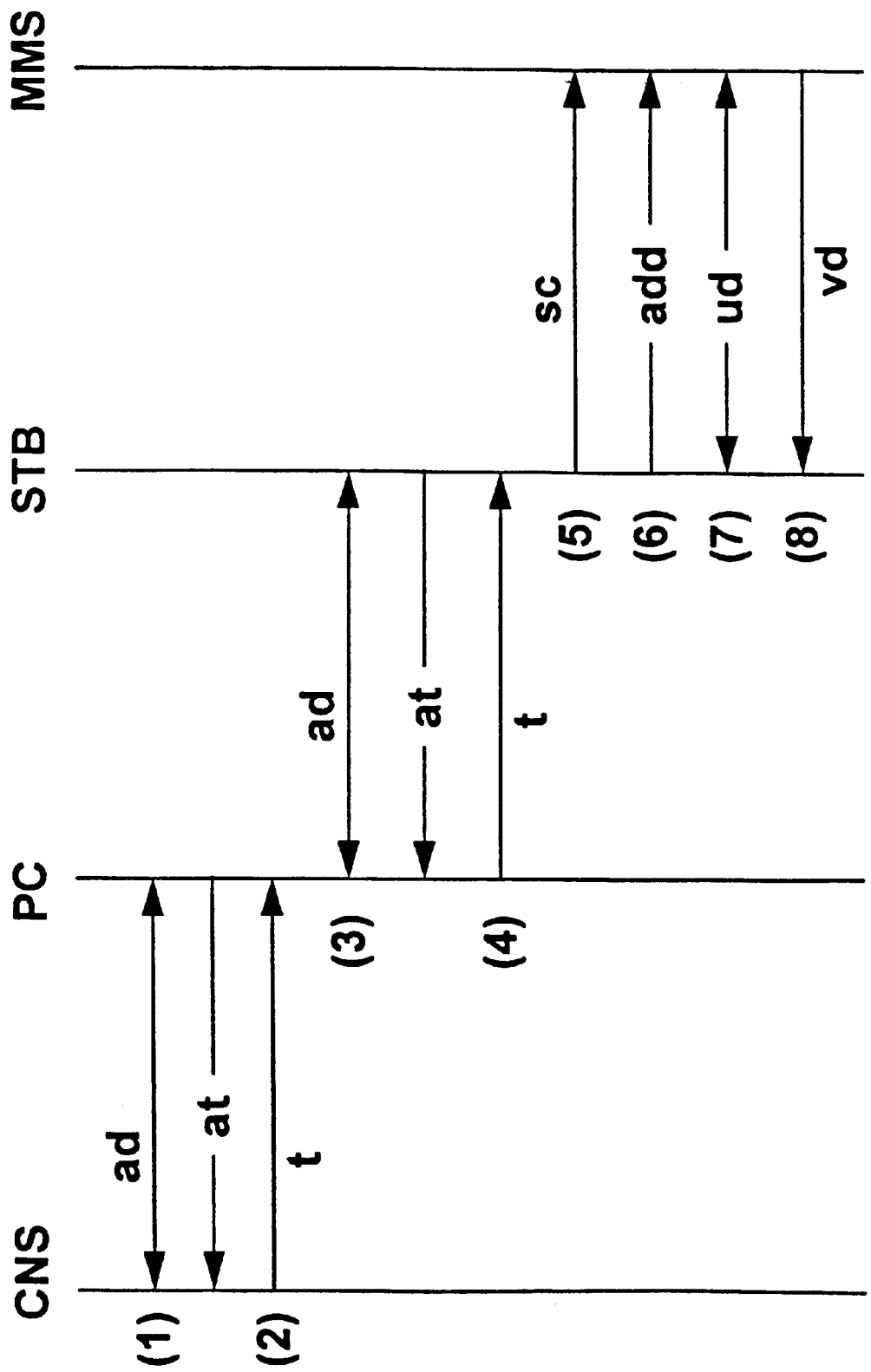
FIG. 3 schematically shows the execution of the method in a preferred embodiment of the present invention.

The employment of the ticket for calling interactive video services and other multimedia offerings is described by way of example on the basis of the executive sequence shown in FIG. 3:

1. According to the configuration shown in FIG. 1, a PC that is connected to a computer network, for example the Internet, is employed for the selection of the video service. The user communicates with a network server CNS, which is likewise connected to the computer network, in order to select (ad) an interactive video service or a video film. For example, a browser for the World-Wide Web can be employed therefor in the Internet.

2. A plurality of tickets (t) can be transmitted from the network server via the computer network to the PC during the course of the selection procedure and can be stored (at) thereat. This can ensue in the Internet, for example, with the assistance of existing applications like FTP or World-Wide Web browsers.

3. After the desired tickets (t) are stored on the PC, the user can turn to his set top box STB in order to use an interactive video service. When one of the stored tickets is to be thereby employed, a connection to the PC is set up proceeding from the set top box. When a plurality of tickets are stored on the PC, a local navigator is employed for the selection (ad). This interprets the content-related data of the tickets (t) and generates corresponding selection menus.

4. After the selection of a ticket, this is transmitted (t) to the set top box STB.

5. The set top box interprets the access datafile contained in the ticket and sets up a control connection (sc) to the server for interactive video services. The control information contained in the access datafile are interpreted in order to automatically select the corresponding video service or film.

6. The set top box hands over (add) the additional data contained in the ticket to the video server for further interpretation.

7. The video server can initiate a dialog (ud) with the user in order, for example, to interrogate the password valid for this ticket. If the ticket contains no billing data, these must now be interactively input.

8. After the termination of all inputs, a broadband connection is set up between video server and set top box in order to transmit (vd) the video data (for example, a video film).

The disclosed invention has various advantages compared to previous solutions. First, the introduction of electronic tickets that can be called via computer networks such as the Internet enables simple and user-friendly access to the offered services for interested users.

Due to the employment of the tickets, further, the transmission of the selection information from the PC to the set top box and, further, to the video server is automated. As a result thereof, a renewed traversal of the navigator on the video server can be avoided.

The invention also has the advantage that every user can configure individual selection menus on his PC. To that end, the PC requires a specific navigator that supports the administration, presentation and selection of the tickets. On the basis of the present disclosure of the invention, however, a person skilled in the art is in the position to produce such navigators without further ado.

Although other modifications and changes may be suggested by those skilled in the art, it is the intention of the inventors to embody within the patent warranted hereon all changes and modifications as reasonably and properly come within the scope of their contribution to the art.

Finally, the invention enables a pre-payment in interactive video services. As a result thereof, for example, the service vendor is given the possibility of granting specific price reductions given immediate payment of the ticket.

What is claimed is:

1. A method for selection and calling of multimedia service, comprising the following steps:
   a) selecting by a user with assistance of a data communication terminal equipment connected to a computer network at least one offering of a multimedia service that is stored on a multimedia server;
   b) transmitting as a result of said selecting step a datafile with access data for access to a user's terminal equipment; the access data unambiguously identifying a selected one of said at least one offering and comprise the information required for calling the at least one offering of the multimedia service;
   c) based on criterion of the user, the access data contained in said datafile being one of
      c1) immediately transmitted to a set top box located physically apart and being distinct from said terminal equipment, and
      c2) initially stored by the terminal equipment in order to be transmitted via a broadband network different from said computer network to said set top box later;
   d) generating a selection menu, with whose assistance a user selects an offering, on the set top box from data of at least one datafile; and
   e) interpreting by the set top box the data contained in the datafile and setting up corresponding connections to the multimedia server via said broadband network with which the selected offering is called.

2. A method according to claim 1, wherein the datafile also contains additional data with further information on a selected offering.

3. A method according to claim 2, wherein the additional data comprise content-related data describing the multimedia offering.

4. A method according to claim 2, wherein the additional data support an access control to the user's set top box.

5. A method according to claim 2, wherein the additional data contain billing data corresponding the selected offering.

6. A method according to claim 1, further comprising the step of:
   transmitting the data of the selected offering from the data communication terminal equipment to the set top box via a public communication network.

7. A method according to claim 1, further comprising the step of:
   transmitting the data of the selected offering from the data communication terminal equipment to the set top box via a local connection.

8. A method as claimed in claim 1, wherein said connections to the multimedia server provides video on demand services to said set top box and said selected offering being a video on demand.

9. A method as claimed in claim 1, wherein said selecting step utilizes a browser program in a personal computer as a user interface.

10. A method for selecting and calling multimedia services, comprising the steps of:
    connecting a personal computer over a computer network to a network server having multimedia service information;
    selecting at least one multimedia service from said multimedia service information using said personal computer;
    generating a ticket datafile on said network server corresponding to each of said at least one multimedia service selected in said selecting step;
    transmitting a corresponding one of said ticket datafile to said personal computer for storage for each selected multimedia service;
    accessing ones of said ticket datafile stored in said personal computer with a set top box located physically apart and being distinct from said personal computer;
    generating a menu of multimedia services in said set top box for ticket datafiles stored in said personal computer;
    choosing a desired multimedia service from said menu;
    establishing a connection via a broadband network different from said computer network between said set top box and a server having said desired multimedia service using information in said ticket datafile of said desired multimedia service; and
    transmitting said desired multimedia service to said set top box for display on a television.

* * * * *